(12) United States Patent
Gravel et al.

(10) Patent No.: US 10,565,859 B2
(45) Date of Patent: Feb. 18, 2020

(54) INDOOR POSITIONING SYSTEM FOR FIRE ALARM SYSTEM

(71) Applicant: Tyco Safety Products Canada Ltd., Concord (CA)

(72) Inventors: Bruno Gravel, Chambly (CA); David-Alexandre Bourbonnais, Candiac (CA)

(73) Assignee: Tyco Safety Products Canada Ltd., Concord, ON (CA)

( * ) Notice: Subject to any disclaimer, the term of this patent is extended or adjusted under 35 U.S.C. 154(b) by 0 days.

(21) Appl. No.: 15/953,627

(22) Filed: Apr. 16, 2018

(65) Prior Publication Data

US 2019/0318611 A1 Oct. 17, 2019

(51) Int. Cl.
| G08B 1/08 | (2006.01) |
| G08B 26/00 | (2006.01) |
| G06F 3/147 | (2006.01) |
| G06T 11/60 | (2006.01) |
| G08B 17/00 | (2006.01) |

(52) U.S. Cl.
CPC .......... *G08B 26/007* (2013.01); *G06F 3/147* (2013.01); *G06T 11/60* (2013.01); *G08B 17/00* (2013.01)

(58) Field of Classification Search
CPC .......... G08B 17/00; G08B 26/00; G06F 3/147
See application file for complete search history.

(56) References Cited

U.S. PATENT DOCUMENTS

| 2006/0290519 A1* | 12/2006 | Boate ................. G07C 9/00111 340/573.4 |
| 2011/0143768 A1 | 6/2011 | Lane et al. |
| 2015/0172856 A1 | 6/2015 | Vanderwater et al. |
| 2016/0049064 A1* | 2/2016 | McNabb ................. G06F 16/29 340/540 |
| 2016/0110833 A1* | 4/2016 | Fix ....................... G06Q 50/265 705/324 |
| 2016/0381537 A1* | 12/2016 | R ............................ H04W 4/90 455/404.1 |
| 2017/0124836 A1* | 5/2017 | Chung ................... H04W 4/90 |

FOREIGN PATENT DOCUMENTS

| EP | 1 814 092 | 1/2007 |
| WO | WO 2015184253 | 12/2015 |

OTHER PUBLICATIONS

Communication dated Sep. 10, 2019, from European Patent Application No. 19163213.2, filed on Mar. 15, 2019. 7 pages.

* cited by examiner

*Primary Examiner* — Phung Nguyen
(74) *Attorney, Agent, or Firm* — HoustonHogle LLP

(57) ABSTRACT

A building management system tracks occupants of a building in which the building management system is installed and presents information about the occupants, including location information, to first responders during emergency and/or training events. Distributed devices of the building management system receive identification information broadcast by user devices of the occupants and sends the identification information to a control panel of the building management system. Location information for the occupants is generated based on the identification information received from the user devices and stored along with time and date information. This location information is then retrieved and presented to first responders, for example, by displaying a map of the building with icons representing the distributed devices and occupants, based on the location information.

21 Claims, 9 Drawing Sheets

INDOOR POSITIONING SYSTEM FOR FIRE ALARM SYSTEM

BACKGROUND OF THE INVENTION

Building management systems such as building automation systems, fire alarm systems and intrusion systems are often installed within premises such as commercial, residential, or governmental buildings. Examples of these buildings include offices, hospitals, warehouses, public infrastructure buildings including subways and bus terminals, multi-unit dwellings, schools or universities, shopping malls, government offices, and casinos.

Fire alarm systems typically include fire control panels that function as system controllers and distributed devices positioned throughout the buildings and connected to the panels. Some examples of distributed devices include fire detection/initiation devices such as smoke detectors, carbon monoxide detectors, flame detectors, temperature sensors, and/or pull stations (also known as manual call points), and fire notification devices such as speakers, sounders, horns, bells, chimes, light emitting diode (LED) reader boards, and/or flashing lights (e.g., strobes).

The fire detection devices monitor the buildings for indicators of fire. Upon detection of an indicator of fire such as smoke or heat or flames, the distributed device is activated and a signal is sent from the activated distributed device to the fire control panel. The fire control panel then initiates an alarm condition by activating audio and visible alarms of the fire notification devices of the fire alarm system, which are also distributed around the building. Additionally, the fire control panel will also send an alarm signal to a monitoring station, which will notify the local fire department or fire brigade. In response to a fire alarm, occupants of the building are often trained and expected to evacuate to a designated safe location, or rally point.

Recently, it has been proposed to use connected services systems to monitor fire alarm systems. Connected services systems are remote systems that communicate with the building management systems and are sometimes administered by separate business entities than the owners and/or occupants of the buildings, which contain the building managements systems. For example, the connected services system can be administered by a building management system manufacturer and/or an entity providing service on the building management systems.

At the same time, occupants of these buildings commonly possess wireless-enabled user devices such as mobile computing devices (e.g. smart phones, tablets, laptops, and/or smart watches), or even identification badges for access control systems, which wirelessly communicate with other devices using, for example, Bluetooth technology protocols such as Bluetooth Low Energy (BLE). During normal operation, many of these user devices wirelessly broadcast unique identification information such as serial numbers, media access control (MAC) addresses and/or universally unique identifiers (UUID) in order to facilitate establishing personal area networks (PAN), for example, with the other devices.

SUMMARY OF THE INVENTION

During fire alarm events, it is common for companies or building management entities to have designated individuals that manage rally points during evacuations. The building occupants will typically be instructed to meet at one or several of these rally points around the building. By taking a count of occupants at the rally points, it is possible for the designated individuals to provide information to first responders concerning individuals still possibly trapped in the building.

It remains difficult or impossible, however, to count the number of individuals remaining inside the building or to determine the location of individuals who have not been counted at one of the rally points. As a result, individuals in danger cannot be quickly located.

The present invention can be used to increase the speed by which individuals at rally points are counted and individuals in danger are located. Thus, first responders can efficiently execute rescue operations. It can utilize existing sensor networks of a fire alarm systems, for example, by adding sensors, such as BLE receivers and/or RFID readers, for detecting wireless-enabled user devices carried by occupants of the building. By detecting wireless signals emitted by these devices and applying algorithms to create an indoor positioning system, individuals can be located with enough accuracy to improve the response time of emergency services. User devices carried by occupants of the building (e.g. access cards, mobile phones) periodically broadcast signals containing identification information. Using the identification information and signal strength received by each sensor, positions of occupants are calculated and provided to emergency services.

In general, according to one aspect, the invention features a building management system for a premises, including distributed devices and a control panel. The distributed devices comprise wireless receivers for receiving broadcast identification information from user devices. The control panel generates location information based on the identification information received by the distributed devices and presents the location information for first responders on one or more displays.

In embodiments, the building management system is a fire alarm, security, building automation and/or access control system, and the user devices include mobile computing devices, identification badges, and/or wearable beacons. One or more distributed devices are positioned at predetermined rally points of the premises where occupants of the premises are instructed and/or expected to meet during emergency and/or training events, and the control panel presents for first responders rally status information for the emergency and/or training events. Location information for users of the user devices is generated by matching location information associated with the distributed devices that received the broadcast identification information with user information associated with the identification information. The one or more displays include displays that are integral with the control panel and/or displays of computing devices connected to the building management system via a connected services system. The control panel presents the location information by displaying a map of the premises with graphical elements representing users of the user devices overlaid on the map in different positions with respect to the map based on the location information. In addition to the location information, the control panel can also present first responders with user information associated with users of the user devices.

In general, according to another aspect, the invention features a method of operation of a building management system for a premises. Distributed devices of the building management system receive broadcast identification information from user devices via wireless receivers of the distributed devices. Location information is then generated based on the identification information received by the distributed devices and presented for first responders on one or more displays.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Figure 1:
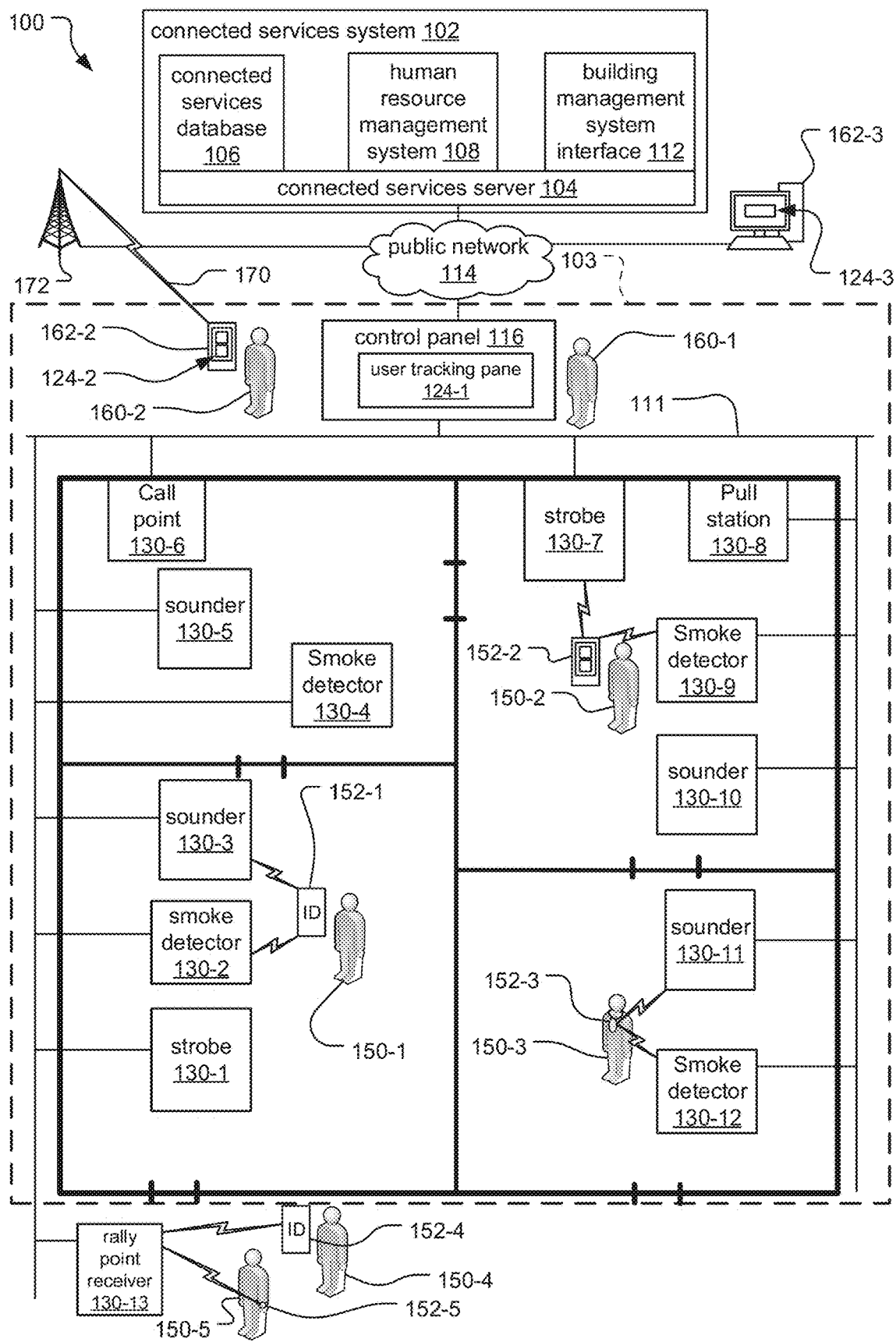
FIG. 1 is a schematic diagram of a building management system according to an embodiment of the current invention.

FIG. 1 is a schematic diagram of a building management system 100 according to an embodiment of the current invention.

The building management system 100 is installed at a premises such as a building 103. Examples of the buildings include offices, hospitals, warehouses, retail establishments, shopping malls, schools, multi-unit dwellings, government buildings, or casinos, to list a few examples.

Occupants 150 of the building 103 are individuals who might be located anywhere in the building 103 during a normal course of business, including employees of entities occupying the building 103, residents, or visitors, among other examples. The occupants 150 carry wireless-enabled user devices 152, which wirelessly communicate with other devices using, for example, Bluetooth technology protocols such as Bluetooth Low Energy (BLE). During normal operation, the user devices 152 wirelessly broadcast identification (ID) information such as serial numbers, media access control (MAC) addresses and/or universally unique identifiers (UUID) in order to facilitate establishing personal area networks (PAN) with the other devices. The user devices 152 can include mobile computing devices 152-2, 152-5 such as laptop computers, tablet computers, phablet computers (i.e., a mobile device that is typically larger than a smart phone, but smaller than a tablet), smart watches, to list a few examples. The user devices can also include ID badges 152-1, 152-4 for access control systems, which are cards or tags that transmit ID information to access control readers of access control systems in order to validate entry of occupants 150 through access points of the access control system into restricted areas of the building 103.

During emergency and/or training events, which might include an emergency situation or a training event for occupants 150 for how to respond during an emergency, occupants 150 of the building 103 are trained and/or expected to meet at designated rally points, which might be, for example, designated outdoor safe areas a safe distance from the building 103.

On the other hand, first responders 160 are individuals to whom information about occupants 150 is presented during the emergency and/or training events. The first responders 160 can include emergency services personnel such as emergency medical technicians, police officers fire fighters, employees of entities occupying the building 103, property managers, building management system manufacturers and/or providers of service for building management systems. In general, first responders 160 access the information about the occupants 150 via components of the building management system 100 and/or computing devices 162 connected to or in communication with the building management system 100. In general, these first responder computing devices 162 can include mobile computing devices or other computing devices with network connectivity to the building management system 100.

In general, the building management system 100 includes a control panel 116 and distributed devices 130. The control panel 116 directs the function of the building management system 100 by determining and displaying the operational status of or sensor data from the distributed devices 130 or sending instructions to the distributed devices 130 to perform a function of the building management system 100, among other examples. The distributed devices 130 also receive, via wireless receivers, the broadcast ID information from the user devices 152 and send the broadcast ID information to the control panel 116 and/or the connected services server 104, which generates location information for the occupants 150 using the user devices 152 based on the broadcast ID information. This location information represents the current position of the occupant 150 within the building 103.

The distributed devices 130 are connected to the control panel 116 via a safety and security wired and/or wireless network 111 of the building 103. These networks 111 support data and/or analog communication between the distributed devices 130 and the control panel 116.

In the illustrated example, distributed devices 130 of a fire alarm system 100 are connected to a fire alarm system control panel 116 via the safety and security network 111 and are slave devices of the panel.

The distributed fire alarm devices 130 include alarm initiation devices including smoke detectors 130-2, 130-4, 130-9, 130-12 and manually activated devices such as call points 130-6 and pull stations 130-8. Alarm initiation devices can also include devices that are not depicted in the illustrated example, including carbon monoxide detectors and heat detectors, to list a few examples. The alarm initiation devices monitor the buildings for indicators of fire. Upon detection of indicators of fire, device signals are sent from the alarm initiating devices to the control panel 116. The device signals are typically alarm signals and/or analog values. The alarm signals are used to signal the control panel 116 that a fire has been detected. Alternatively, some devices provide analog values to indicate measured conditions. In one example, temperature sensors provide analog values for measured temperatures. In another example, smoke sensors provide analog values indicating smoke obscuration levels. The control panel 116 then determines if the analog values are indicative of a fire. Additionally, in some examples, the alarm initiation devices provide both alarm signals and analog values.

The distributed fire alarm devices 130 further include fire notification devices, which notify occupants of the building 103 of a potential fire and generally include sounders 130-3, 130-5, 130-10, 130-11, which might include speakers, horns, bells, and/or chimes, and flashing lights (e.g., strobes) 130-1, 130-7. Alarm notification devices can also include devices that are not depicted in the illustrated example, including light emitting diode (LED) reader boards, to list one example. In response to detection of indicators of fire, the fire alarm system control panel 116 initiates an alarm state, which activates the fire notification devices.

The distributed devices 130 also include a rally point receiver 130-13, which is a device positioned at a designated rally point where occupants 150 of the building 103 are trained and/or expected to meet during the emergency and/or training events.

The present system can be extended to other types of building management systems 100. For example in another implementation the panel is an intrusion panel such as a panel that might control a security system, or a building automation panel such as a panel that might control building climate including HVAC.

The building management system 100 also preferably includes a connected services system 102, which, at a high level, communicates with building management systems 100 installed within buildings 103 of various client entities, typically. Examples of client entities include residential, commercial, or governmental companies or agencies.

The control panel 116 and the first responder computing devices 162 operated by first responders 160 are connected to the connected services system 102 via a cellular provider network, private network and/or public network 114, such as the internet. In some cases, the control panels 116 have been given network connectivity to communicate with the connected services system 102; in other cases, computers connected to the control panels 116 function as gateways. The first responder mobile computing device 162-2 connects to the public network 114 via a wireless communication link 170 to a cellular radio tower 172 of a mobile broadband or cellular network or public and/or private wired data networks such as an enterprise network, Wi-Max, or Wi-Fi network, for example.

The connected services system 102 is typically implemented as a cloud system. It can be run on a proprietary cloud system or implemented on one of the popular cloud systems operated by vendors such as Alphabet Inc., Amazon, Inc. (AWS), or Microsoft Corporation.

As a result, the connected services system 102 typically operates on a connected services server system 104. In some cases, this server system 104 is one or more dedicated servers. In other examples, they are virtual servers.

The connected services server system 104 executes a number of separate modules associated with separate tasks. In some cases, these modules are discrete modules or they are combined with other modules into a unified code base. They can be running on the same server or different servers, virtualized server system or a distributed computing system. The connected services server 104 also generally functions as an application server that communicates with the computing devices 162 operated by the first responders 160 and/or the control panel 116 to present information about the occupants 150 of the building 103 during emergency and/or training events.

The connected services system 102 also includes a building management system interface 112. The building management system interface 112 operates as the interface between the connected services system 102 and the control panel 116. In particular, the building management system interface 112 converts instructions from the connected services system 102 into instructions that are formatted into the protocol implemented by the particular panel. Additionally, the building management system interface 112 receives information, for example, from the current control panel 116 or distributed devices 130 and converts the information into a uniform format regardless of the underlying protocol implemented by the panels and distributed devices.

The connected services system 102 includes a connected services database, which maintains information about devices of the building management system 100 and the building 103. In particular, the connected services database 106 includes lists of distributed devices 130 installed at various customer premises along with location information associated with the devices representing the devices' position within the building 103, for example, with respect to a map depicting a layout of the building 103.

On the other hand, a human resource management system 108 of the connected services system 102 maintains information about the occupants 150 of the building 103.

In general, location information for the occupants 150 of the building 103 is generated based on location information for the distributed devices 130 retrieved from the connected services database 106. This location information for the occupants 150 is stored in the human resource management system 108 along with time information (such as a timestamp indicating the current date and time). During emergency and/or training events, this location information for the occupants 150 is accessed and presented, for example, via a user tracking pane 124, which indicates information including location information for the occupants 150 of the building 103. The user tracking pane 124 is generally a screen or component of a graphical user interface (GUI) rendered on a display of the control panel 116, or first responder computing devices 162.

In the illustrated example, occupant 150-1, carries an ID badge 152-1, which broadcasts ID information that is received by a nearby smoke detector 130-3 and sounder 130-3. Occupant 150-2, carries mobile computing device 152-2, which broadcasts ID information that is received by a nearby smoke detector 130-9 and strobe 130-7. Occupant 150-3, wears a wireless beacon 152-3, which broadcasts ID information that is received by a nearby smoke detector 130-12 and sounder 130-11. Occupants 150-4 and 150-5 stand near a rally point equipped with a rally point receiver 130-13. Occupant 150-4 carries an ID badge 152-4, and occupant 150-5 wears a smart watch 152-5, both of which broadcast ID information that is received by the rally point receiver 130-13. First responder 160-1 is presented with occupant information via the user tracking pane 124-1 of the control panel 116, while first responder 160-2 is presented with occupant information via the user tracking pane 124-2 of the first responder mobile computing device 162-2.

Figure 2A:
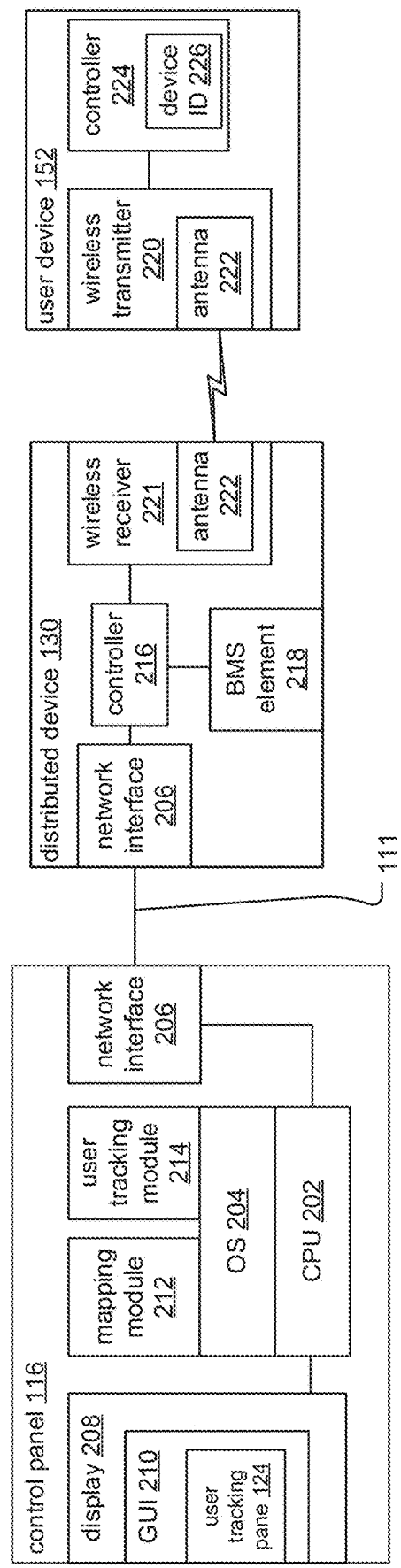
FIG. 2A is a schematic diagram of an exemplary control panel, distributed device and user device, according to a first embodiment of the present invention.

FIG. 2A is a schematic diagram showing an exemplary control panel 116, distributed device 130 and user device 152, according to one embodiment of the present invention.

The user device 152 includes a controller 224, a wireless transmitter 220 and an antenna 222 along with potentially other components that are not illustrated (such as in the example of a smart phone or smart watch). The controller 224 directs the functionality of the user device 152, in general, and drives the wireless transmitter 220, which broadcasts stored identification information (e.g. a device ID 226 stored in memory to which the controller 224 has access) via the antenna 222. According to one embodiment, the wireless transmitter 220 broadcasts the device ID 226 using the Bluetooth wireless protocol.

Bluetooth is a wireless technology that operates in a 2.4 GHz (gigahertz) short-range radio frequency band. In free space, Bluetooth applications typically locate a Bluetooth device by calculating the distance of the user devices 152 from the signal receivers. The distance of the device from the receiver is closely related to the strength of the signal received from the device. A lower power version of standard Bluetooth called Bluetooth Low Energy (BLE), in contrast, consumes between ½ and ¹⁄₁₀₀ the power of classic Bluetooth. BLE is optimized for devices requiring maximum battery life, as compared to the emphasis upon higher data transfer rates associated with classic Bluetooth. BLE has a typical broadcast range of about 100-150 feet (approximately 35-46 meters).

When transmitting via BLE, the user devices 152 might send an AltBeacon compliant BLE broadcast message every second. In an alternative implementation, the user devices 103 are capable of broadcasting via standard Bluetooth. In still other alternative implementations, the user devices 103 may broadcast via other wireless technologies such as Wi-Fi (IEEE 802.11), active RFID (radio frequency identification), or ZigBee, to list a few examples.

The distributed device 130 includes a controller 216, a wireless receiver 221, an antenna 222, a network interface 206, and a building management system (BMS) element 218. The controller 216 executes firmware instructions and, in general, sends instructions to and receives data from the wireless receiver 221, network interface 206, and BMS element 216. The wireless receiver 221 receives via the antenna 222 the broadcast device ID 226 transmitted by the user device 152. The broadcast device ID 226 is then sent to the control panel 116 via the network interface 206 over network 111 along with signal strength information including measurements of the signal strength of the wireless signals detected by the wireless receiver 221. The BMS element 218 generically refers to the components of the distributed device 130 that perform the functionality of the particular type of distributed device 130. For example, for a smoke detector 130-2, 130-4, 130-9, 130-12, the BMS element 218 might include a smoke sensor, whereas for a strobe 130-1, 130-7, the BMS element 218 might include an indicator light.

The control panel includes a central processing unit (CPU) 202, a network interface 206, and a display 208. The CPU 202 executes firmware instructions and, in general, directs the function of the control panel 116 by sending instructions and receiving signals and/or data from the distributed devices 130 via the network interface 206, executing instructions and retrieving data from the connected services system 102 via the network interface 206, and rendering a graphical user interface (GUI) 210 on the display 208. A mapping module 212 and a user tracking module 214 execute on an operating system (OS) 204 that in turn executes on the CPU 202.

The mapping module 212 renders the user tracking pane 124 on the display 208 of the control panel 116 based on the location information associated with different distributed devices and user devices of the occupants 150 respectively detected by each of the distributed devices 130. In one example, the mapping module 212 does this by receiving a map of the building 103 from the connected services system 102 and translating the location information for the distributed devices 130 and occupants 150 into icon position information indicating different positions with respect to the map of icons representing the distributed devices 130 and occupants 150.

The user tracking module 214 generates location information based on the device IDs 226 and signal strength information received from the distributed devices 130. In one example, the user tracking module 214 matches location information associated with the distributed devices 130 that received the broadcast device IDs 226 with occupant information associated with the device ID 226 in order to generate location information for the occupant 150 using the user device 152. This location information for the occupant 150 is further refined based on the signal strength information from the distributed device 130, as the relative position of the occupant 150 with respect to the distributed devices 130 that received the device ID 226 associated with the occupant 150 is determined.

Figure 2B:
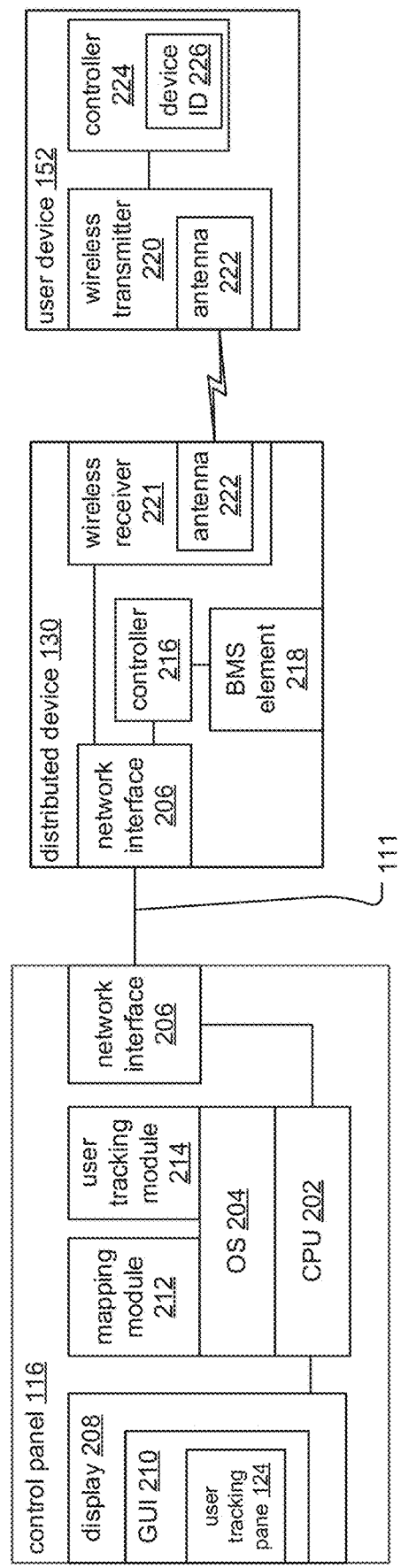
FIG. 2B is a schematic diagram of an exemplary control panel, distributed device and user device, according to a second embodiment of the present invention.

FIG. 2B is a schematic diagram showing an exemplary control panel 116, distributed device 130 and user device 152, according to another embodiment of the present invention. Here, the controller 216 of the distributed device 130 does not control the wireless receiver 221, which operates independently from the controller 216 and sends the device ID 226 and the signal strength information to the control panel 116 via an independent connection to the network interface 206. This embodiment ensures that the controller 216 is available to perform the functions associated with the building management system functions (e.g., smoke detection) associated with the device 130.

Figure 2C:
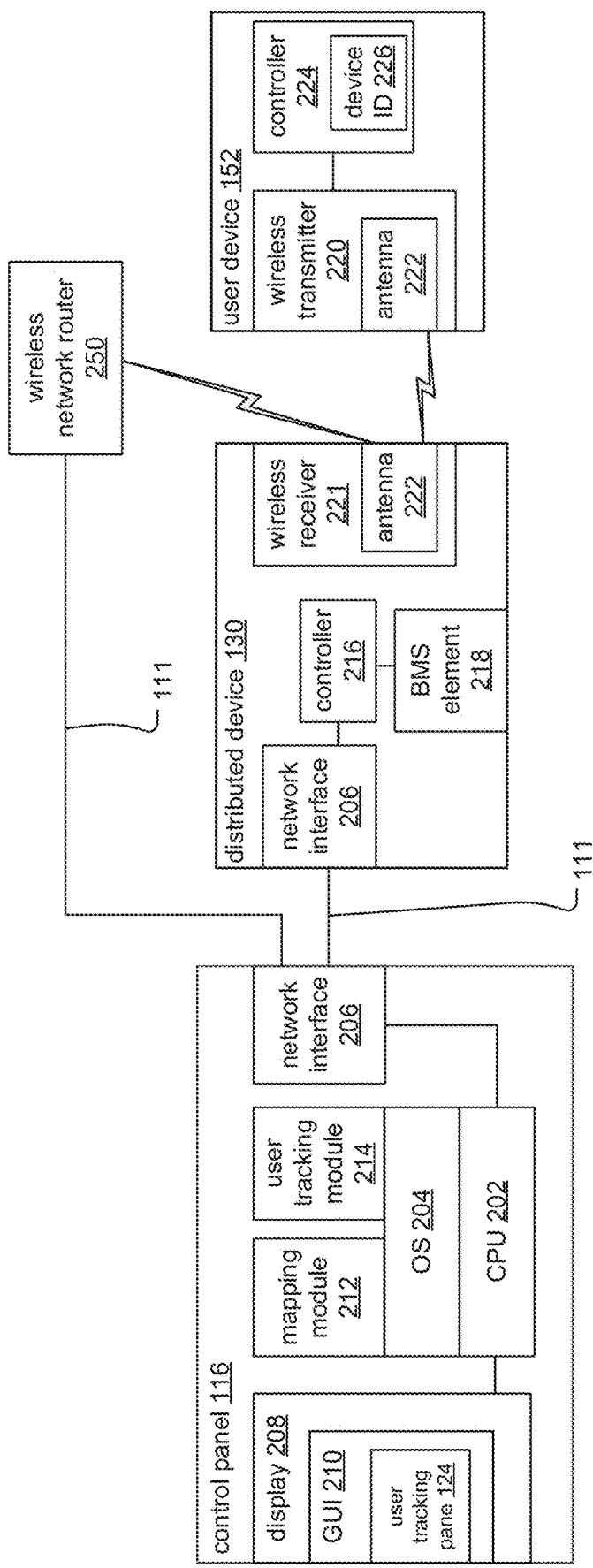
FIG. 2C is a schematic diagram of an exemplary control panel, distributed device and user device, according to a third embodiment of the present invention.

FIG. 2C is a schematic diagram showing an exemplary control panel 116, distributed device 130 and user device 152, according to another embodiment of the present invention. Here, the controller 216 of the distributed device 130 does not control the wireless receiver 221, which operates entirely independently from the other components of the distributed device 130 as an independent module. In this example, the wireless receiver 221 sends the device ID 226 and the signal strength information to the control panel 116 via a wireless communications link to a wireless network router 250 of the safety and security wired and/or wireless network 111 of the building 103. This embodiment ensures that the controller 216 and network 110 are fully available to perform the functions associated with the building management system functions (e.g., smoke detection) associated with the device 130.

Figure 2D:
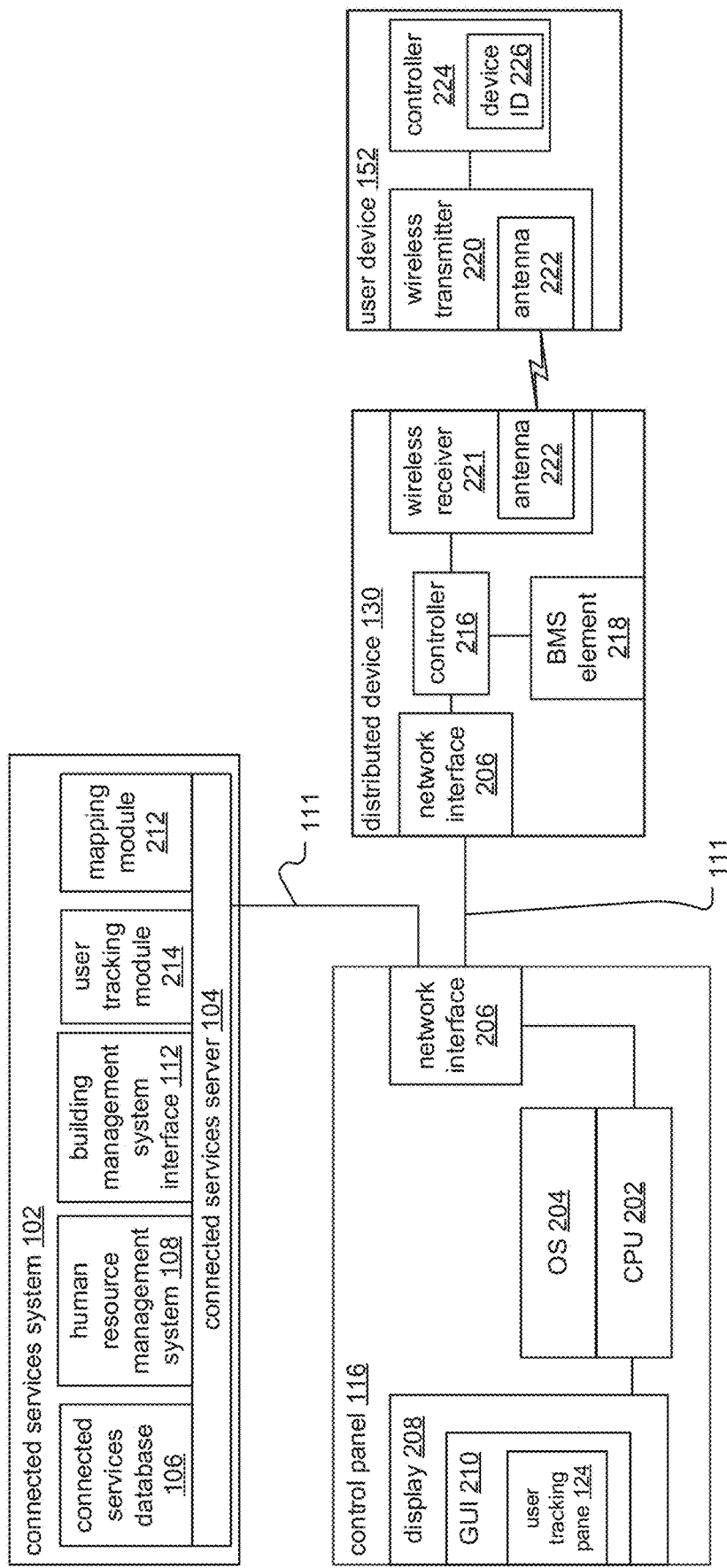
FIG. 2D is a schematic diagram of an exemplary control panel, distributed device and user device, according to a fourth embodiment of the present invention.

FIG. 2D is a schematic diagram showing an exemplary control panel 116, distributed device 130 and user device 152, according to another embodiment of the present invention. Here, the user tracking module 214 and the mapping module 212 executes on the connected services server 104 instead of the control panel 116. In this example, the user tracking module 214 receives the device IDs 226 either via the control panel 116 or directly from the distributed devices 130 (e.g. via the public network 114), generates the location information, and sends the location information to be stored in the human resource management system 108. Similarly, the mapping module 212 retrieves the location information from the human resource management system 108 and the connected services database 106, generates the icon position information, and pushes the icon position information to the control panel 116 or to the first responder computing devices 162 to be presented via the user tracking panes 124 on those devices. Both the user tracking module 214 and the mapping module 212 can execute on other systems connected to the control panel 116 that have more computing power or using cloud computing if even more computing power is required.

Figure 3:
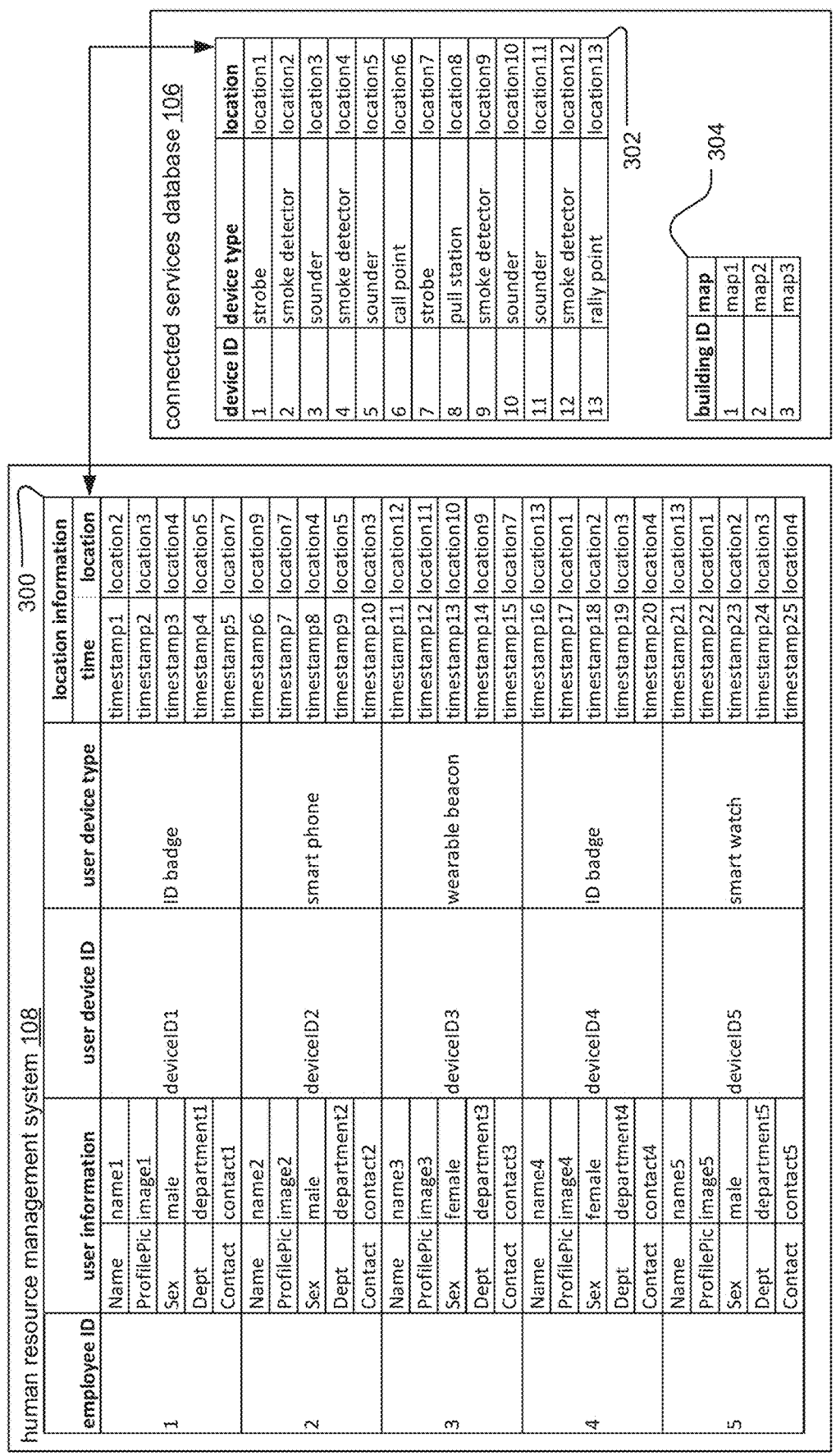
FIG. 3 is a schematic diagram showing an exemplary connected services database and human resources management system.

FIG. 3 is a schematic diagram showing an exemplary connected services database 106 and human resources management system 108.

The connected services database 106 includes a device table 302 and a map table 304.

The device table 302, which maintains information associated with different distributed devices 130 of a particular building management system 100, includes columns for a device ID, or unique identifier, a device type, and location information. The location information could refer to information with respect to the layout of the building (e.g. floor number, room number, wing), position information with respect to floor plans or maps of the building 103, or position information with respect to an indoor location tracking system, among other examples.

In the illustrated example, the device table 302 lists thirteen different devices, including strobes 130-1, 130-7, smoke detectors 130-2, 130-4, 130-9, 130-12, sounders 130-3, 130-5, 130-10, 130-11, call points 130-6, pull stations 130-8 and rally points 130-13, with device IDs ranging from 1-13, each associated with a different location from location1-location13.

The map table 304 maintains information about maps for different buildings 103 and includes a column for a building ID and maps.

In the illustrated example, the map table 304 lists three buildings 103 with building IDs ranging from 1-3, each associated with map1, map2, and map3 respectively.

The human resource management system 108 includes an employee table 300, which maintains information associated with different occupants 150 (which, in the illustrated example, are employees of entities occupying the building 103). The employee table 300 includes columns for employee IDs, user information, including name, a profile picture, sex, department, and contact information, user device ID, identifying the user device 152 that is associated with the 150, user device type, and location information. The location information includes historical location information for the occupant 150, including timestamps associated with different locations. As with the device table 302, the location information could refer to information with respect to the layout of the building (e.g. floor number, room number, wing), position information with respect to floor plans or maps of the building 103, or position information with respect to an indoor location tracking system, among other examples.

In the illustrated example, the employee table 300 lists five occupants 150 with different names, profile pictures, sexes, departments, and contact information. Each of the occupants 150 is associated with a different device ID for a user device 152, with the device IDs ranging from deviceID1 through deviceID5, including ID badges 152-1, 152-4, smart phones 152-2, wearable beacons 152-3, and smart watches 152-5. Similarly, each of the occupants 150 has an associated location history, with timestamps ranging from timestamp1-timestamp25 associated with locations ranging from location1-13.

Figure 4:
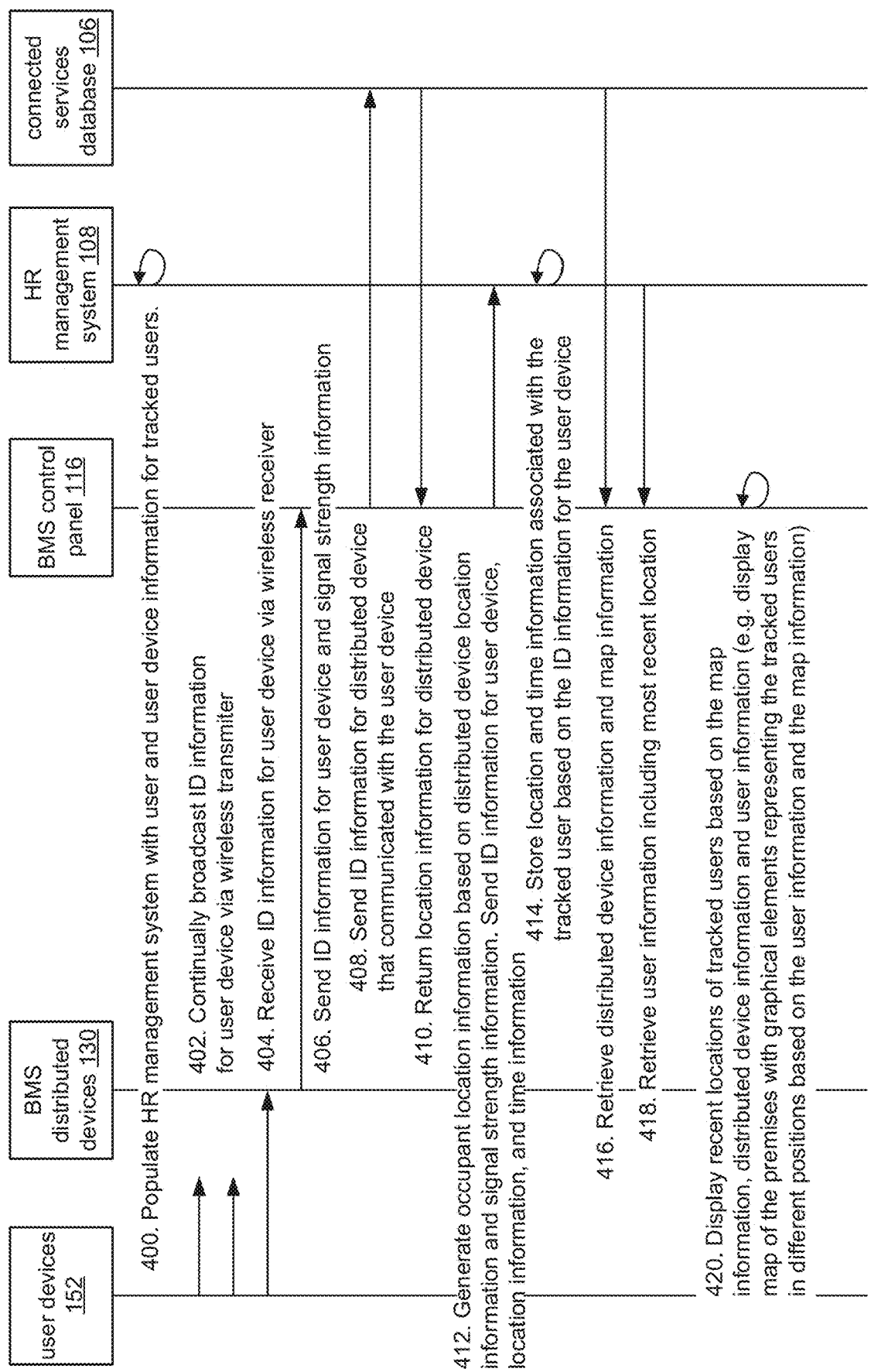
FIG. 4 is a sequence diagram illustrating an exemplary process by which the building management system tracks locations of occupants of the building and provides location information for the occupants to first responders.

FIG. 4 is a sequence diagram illustrating an exemplary process by which the building management system 103 tracks the locations of occupants 150 of the building 103 and provides location information for the occupants 150 to first responders 160.

First, in step 400, the human resource management system 108 is populated with user information for occupants 150 of the building 103 and user device information for user devices 152 of the occupants 150.

Then, in step 402, the user devices 152 continually broadcast identification information (such as the device ID 226).

In step 404, nearby distributed devices 130 receive the identification information and send it to the control panel 406 along with signal strength information for the wireless signals in which the broadcast ID information was encoded.

In step 408, the control panel 116 sends device ID information for the distributed devices 130 that received the broadcast identification information from the user devices 152 to the connected services database 106. In step 410, the connected services database 106 returns location information associated with the distributed devices 130 on which distributed device received the broadcast identification information.

In step 412, location information indicating the location of the occupant 150 based on the location of the distributed device 130 that received the broadcast identification information and based on the signal strength information is generated and sent to be stored on the human resource management system 108 along with the identification information that was received for the user device 152 and time information (e.g. a timestamp). In step 414, the human resource management system 108 looks up the occupant 152 (for example, in the employee table 300) based on the identification information from the user device 152. The human resources management system 108 then stores the location information for the occupant 150 and the time information associated with the occupant 150.

In step 416, the control panel 116 continually retrieves location information and map information from the connected services database 106. Similarly, in step 418, the control panel 116 continually retrieves user information and location information from the human resource management system 108.

In step 420, the recent locations of occupants 150 of the building 103 are displayed based on the user information and the location information for the occupants 150 and the location information for the distributed devices 130. In one example, the control panel 116 renders on the display 208 of the control panel 116 a map of the building 103 with icons representing the occupants 150 of the building in different positions with respect to the map based on the location information for the occupants 150.

Figure 5:
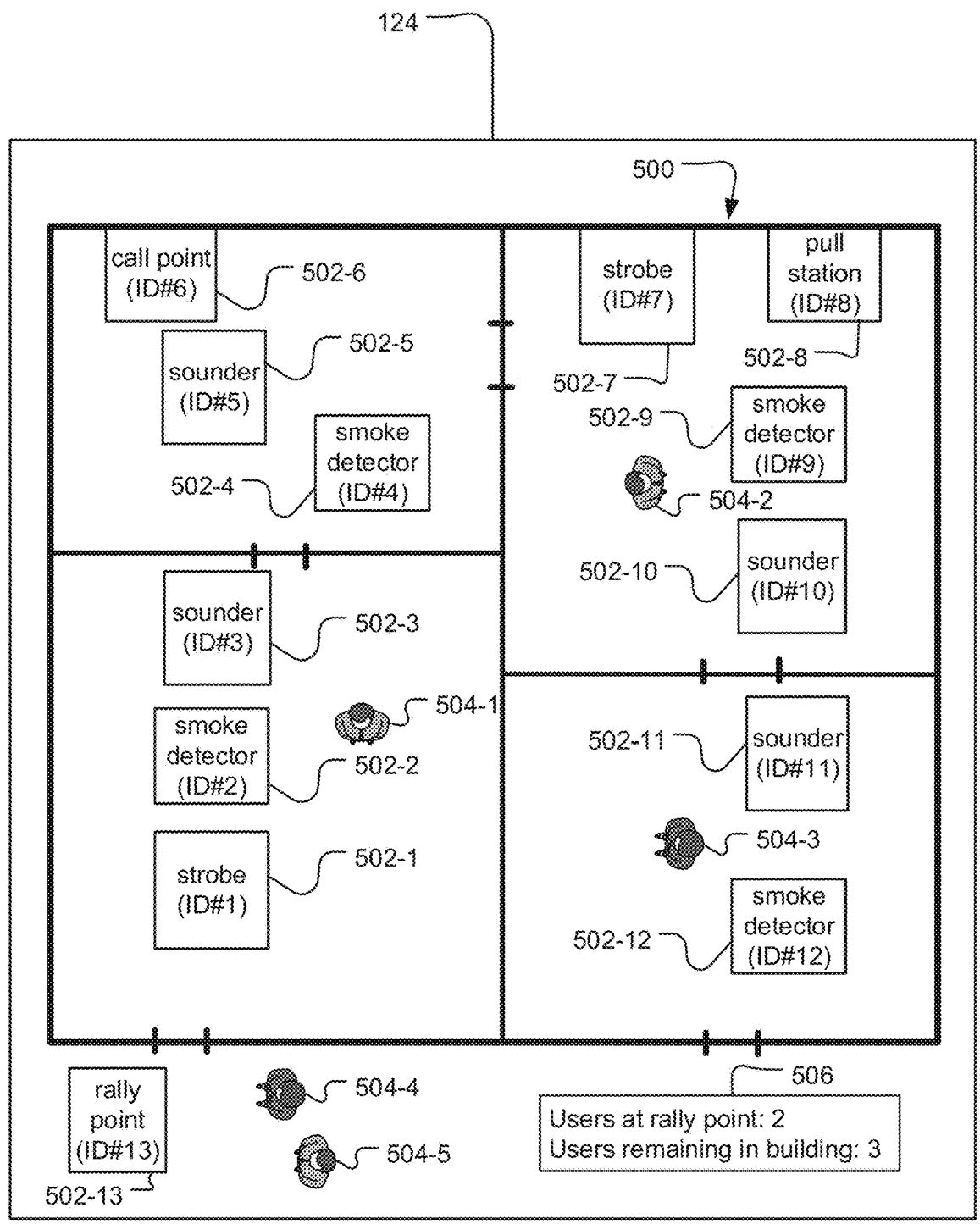
FIG. 5 is an illustration of an exemplary user tracking pane of graphical user interface (e.g. rendered on a touchscreen display of the control panel of the building management system)

FIG. 5 is an illustration of an exemplary user tracking pane 124. In the illustrated example, the user tracking pane 124 is part of the GUI 210 rendered on the touchscreen display 208 of the control panel 116. In other examples, the user tracking pane 124 can be displayed by first responder computing devices 162.

The user tracking pane 124 includes a background map image 500, which is generated based on map information retrieved from the connected services database 106, for example. In general, overlaid on the background map image 500 are graphical elements such as icons, virtual buttons, textual information, and menus for presenting information and receiving input. Selection of the icons, for example, is indicated by the touchscreen display 208 detecting contact (for example, from a user's finger) in regions of the touchscreen display 208 containing the icons. Other input is indicated by the touchscreen display 208 detecting other gestures such as dragging or swiping.

More specifically, the user tracking pane 124 includes distributed device icons 502 and occupant icons 504.

The distributed device icons 502 represent distributed devices 130 and are overlaid on the background map image 500 in different positions with respect to the background map image 500 based on the location information for the distributed devices 130 from the connected services database 106. The distributed device icons 502 include textual information based on the device information from the connected service database 106 such as the device ID from the devices table 302.

Similarly, the occupant icons 504 represent different occupants 150 of the building 103 and are overlaid on the background map image 500 in different positions with respect to the background map image 500 based on the location information for the occupants 150 from the human resource management system 108. The occupant icons 504 include graphical depictions of individuals that vary in orientation and shape based on information from the employee table 300 of the human resource management system 108. For example, some of the occupant icons 504 have male shapes, while others have female shapes based on the user information stored in the employee table 300. Similarly, the orientation of the occupant icons 504 is based on the location information for the occupant 150. For example, the occupant icons 504 appear to be orientated in a direction that the different occupants 150 are determined to be moving based on the location information for the occupants 150.

The user tracking pane 124 also includes a rally status box 506, which is a text box containing textual rally status information indicating the number of occupants 150 who are determined to be located at the rally point 130-13 and the number of occupants 150 who are determined to be located within the building 103.

In the illustrated example, occupant icon 504-1 represents a male occupant 150-1. The position of the occupant icon 504-1 indicates that the occupant 150-1 is located in proximity to the smoke detector 130-1 represented by distributed device icon 502-2 and the sounder 130-3 represented by distributed device icon 502-3. The orientation of the occupant icon 504-1 indicates that the occupant 150-1 might be moving toward the strobe 130-1 represented by distributed device icon 502-1 and the rally point 130-13 represented by distributed device icon 502-13.

Similarly, occupant icon 504-2 represents a male occupant 150-2. The position of the occupant icon 504-2 indicates that the occupant 150-2 is located in proximity to the smoke detector 130-9 represented by distributed device icon 502-9 and the strobe 130-7 represented by distributed device icon 502-7. The orientation of the occupant icon 504-2 indicates that the occupant 150-2 might be moving toward the smoke detector 130-9.

Similarly, occupant icon 504-3 represents a female occupant 150-3. The position of the occupant icon 504-3 indicates that the occupant 150-3 is located in proximity to the smoke detector 130-12 represented by distributed device icon 502-12 and the sounder 130-11 represented by distributed device icon 502-11. The orientation of the occupant icon 504-3 indicates that the occupant 150-3 might be moving away from the sounder 130-11 and the smoke detector 130-13.

Similarly, occupant icons 504-4 and 504-5 represent male and female occupants 150-4 and 150-5 respectively. The position of the occupant icons 504-4, 504-5 indicates that the occupants 150-4, 150-5 are located in proximity to the rally point 130-13.

The rally status box 506 indicates that two occupants 150 have arrived at the rally point 130-13, while three occupants 150 remain in the building 103.

Figure 6:
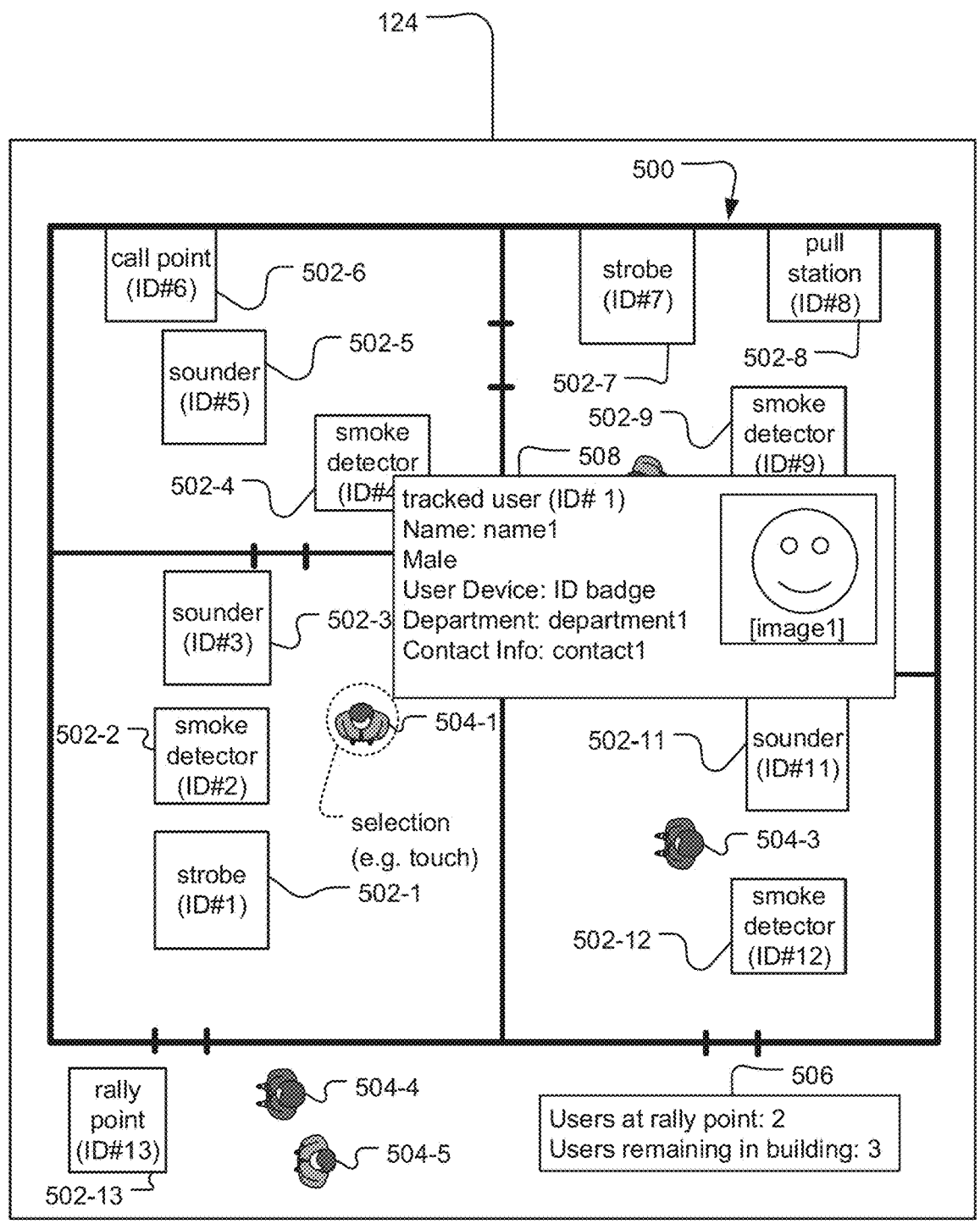
FIG. 6 is an illustration of the user tracking pane showing how user information pertaining to the occupants of the building is displayed in response to selection of occupant icons.

FIG. 6 is an illustration of the user tracking pane 124 showing how user information pertaining to the occupants 150 is displayed in response to selection of occupant icons 504. In the illustrated example, the occupant icon 504-1 has been selected (e.g. by the touchscreen display 208 detecting contact within a region of the display 208 containing the occupant icon 504-1). In response, a user information box 508 is displayed. The user information box 508 is a graphical element containing images and textual information representing the user information from the employee table 300 of the human resource management system 108.

In this way, information about occupants 150 of the building 103, including location information representing the occupants' 150 current or recent location, is presented to first responders 160 during emergency and/or training events.

While this invention has been particularly shown and described with references to preferred embodiments thereof, it will be understood by those skilled in the art that various changes in form and details may be made therein without departing from the scope of the invention encompassed by the appended claims.

What is claimed is:

1. A building management system for a premises, the system comprising:
   distributed devices comprising wireless receivers for receiving broadcast identification information from user devices, wherein the distributed devices include fire initiation devices and fire notification devices; and
   a control panel for generating location information based on the identification information received by the distributed devices and presenting the location information for first responders on one or more displays, wherein the control panel activates audio and visible alarms of the fire notification devices based on alarm signals and/or analog values received from the fire initiation devices.

2. The system as claimed in claim 1, further comprising one or more distributed devices positioned at predetermined rally points of the premises where occupants of the premises are instructed and/or expected to meet during emergency and/or training events.

3. The system as claimed in claim 2, wherein the control panel presents for first responders rally status information for the emergency and/or training events.

4. The system as claimed in claim 1, wherein the building management system is a fire alarm, security, building automation and/or access control system.

5. The system as claimed in claim 1, wherein the user devices include mobile computing devices, identification badges, and/or wearable beacons.

6. The system as claimed in claim 1, wherein location information for users of the user devices is generated by matching location information associated with the distributed devices that received the broadcast identification information with user information associated with the identification information.

7. The system as claimed in claim 1, wherein the one or more displays include displays that are integral with the control panel.

8. The system as claimed in claim 1, wherein the one or more displays include displays of computing devices connected to the building management system via a connected services system.

9. The system as claimed in claim 1, wherein the control panel presents the location information by displaying a map of the premises with graphical elements representing users of the user devices overlaid on the map in different positions with respect to the map based on the location information.

10. The system as claimed in claim 1, wherein the control panel presents for first responders user information associated with users of the user devices.

11. The system as claimed in claim 1, wherein the control panel directs functionality of the building management system by determining and displaying operational statuses of and/or sensor data from the distributed devices and/or sending instructions to the distributed devices to perform functions of the building management system.

12. A method of operation of a building management system for a premises, the method comprising:
   distributed devices of the building management system receiving broadcast identification information from user devices via wireless receivers of the distributed devices, wherein the distributed devices include fire initiation devices and fire notification devices, and a control panel of the building management system activates audio and visible alarms of the fire notification devices based on alarm signals and/or analog values received from the fire initiation devices; and
   generating location information based on the identification information received by the distributed devices and presenting the location information for first responders on one or more displays.

13. The method as claimed in claim 12, wherein one or more distributed devices are positioned at predetermined rally points of the premises where occupants of the premises are instructed and/or expected to meet during emergency and/or training events.

14. The method as claimed in claim 13, further comprising presenting for first responders rally status information for the emergency and/or training events.

15. The method as claimed in claim 12, wherein the building management system is a fire alarm, security, building automation and/or access control system.

16. The method as claimed in claim 12, wherein the user devices include mobile computing devices, identification badges, and/or wearable beacons.

17. The method as claimed in claim 12, further comprising generating location information for users of the user devices by matching location information associated with the distributed devices that received the broadcast identification information with user information associated with the identification information.

18. The method as claimed in claim 12, further comprising presenting the location information on displays that are integral with a control panel of the building management system.

19. The method as claimed in claim 12, further comprising presenting the location information on displays of computing devices connected to the building management system via a connected services system.

20. The method as claimed in claim 12, further comprising presenting the location information by displaying a map of the premises with graphical elements representing users of the user devices overlaid on the map in different positions with respect to the map based on the location information.

21. The method as claimed in claim 12, further comprising presenting for first responders user information associated with users of the user devices.

* * * * *